Inventors
WERNER T. HOWALD
EUGENE H. KLINGELFUSS
FREDERICK P. KENNY
By Their Attorney
John J. Lynch Patented Mar. 14, 1933

1,901,647

UNITED STATES PATENT OFFICE

WERNER T. HOWALD, EUGENE H. KLINGELFUSS AND FREDERICK P. KENNY, OF BROOKLYN, NEW YORK

CLEANING MACHINE

Application filed June 22, 1929. Serial No. 372,974.

This invention relates to cleaning machines and in particular to a type adapted to clean walls and ceilings.

A particular object of our invention is to provide a machine, the parts of which may be manually operated to assist in the cleaning of walls and ceilings, the machine illustrated being specifically adapted for the cleaning of a vehicular tunnel, the walls of which rapidly accumulate the dirt and dust raised by vehicles passing through the tunnel. In order that a vehicle tunnel may be maintained in a sanitary condition, it has been found necessary to make use of white tile walls and other like colored walls which, in order to be kept as clean as possible, must be effectively and thoroughly cleaned frequently. It is with this object in view that we have conceived the idea of building a machine which not only will clean the ceiling of a tunnel but will also clean the curved and straight walls thereof without any change in the equipment and one which is provided with accessories for the cleaning of baffle plates, curbings and the like found in a tunnel of the character referred to.

A further object of our invention is to provide a machine in which is mounted a tank in which the cleaning powder and water or other liquid used to clean the walls is carried, the machine being drawn by a suitable truck carrying a power plant and air compressor, the compressor being arranged to supply air to the liquid carrying tank so that the fluid therein will be fed to the cleaning brushes, thus greatly facilitating the cleaning operation.

Another feature of our invention is the use of a draw bar arrangement which permits the machine or truck being drawn along in proper spaced relation to the wall to be cleaned so that the men employed upon the truck for the cleaning work will not be in danger of falling off the truck by reason of the same being drawn away from the wall a greater distance than expected.

Other important features are the provision of means whereby a baffle cleaning plate brush may be oscillated and at the same time adjusted toward and away from the baffle plate, means being also provided for cleaning the top of a curb through the medium of a brush which is interchangeable from side to side of the truck, depending upon which wall of the tunnel is being cleaned.

A still further particular object of our invention is the provision of a variety of cleaning elements so mounted that they can be readily manipulated by individuals and so arranged in staggered relation that the entire wall surface may be thoroughly cleansed without stopping the truck in its passage through the tunnel.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Figure 6:
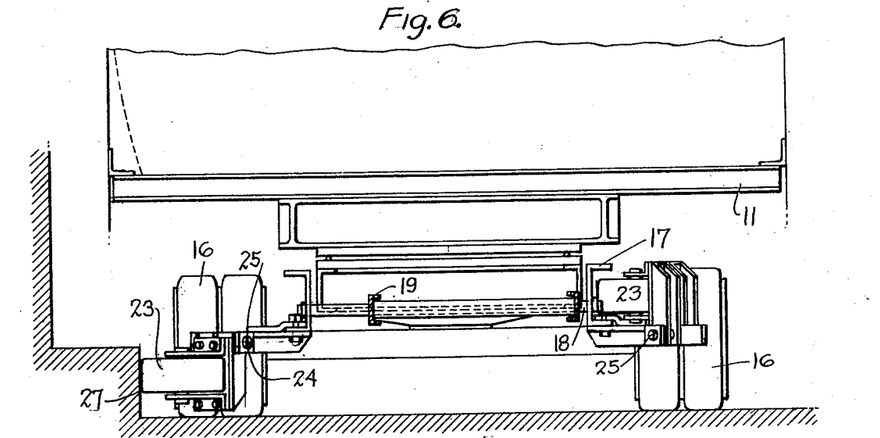
Figure 6 is an enlarged view in front elevation of the lower front end of the truck upon which the cleaning elements are mounted, this view illustrating the use of guide wheels and adjustable draw bar for maintaining a fixed distance between the wall and the track during movement of the latter.
Figures 7, 8:
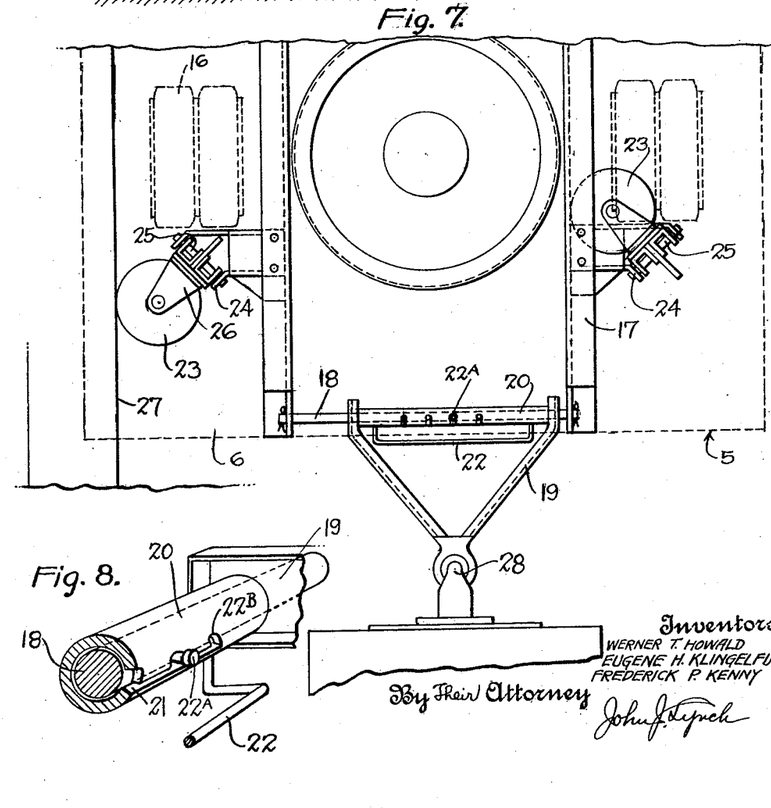
Figure 7 is a fragmentary top plan view of the forward end of the truck chassis as illustrated in Figure 6, the same showing the use of the adjustable draw bar and the pivoted guide rollers which may be thrown back out of the way when not in use.
Figure 8 is a view in perspective of the adjustable draw bar through the medium of which the machine is kept the fixed distance from the wall during its travel through the tunnel.

Referring to the drawings in detail, 5 indicates generally the vehicle, wagon or truck constituting our cleaning machine, the same consisting of a bottom or flooring 6 arranged to provide a step formation consisting of the steps 7, 8 and 9, the sides of the steps 7, 8 and 9 being suitably closed to hide the liquid tank 10 which is mounted on the chassis 11. The forward end of the vehicle is closed through the medium of the wall 12 and at this point, there is supported on the vehicle, suitable ceiling cleaning apparatus indicated generally by the numeral 13. The chassis 11 is movably mounted upon the wheels 14 which are fixed in a suitable axle holding frame 15, while the forward end of the truck or vehicle is mounted upon the wheels 16 carried in the axle frame 17 which also provides for a fifth wheel attachment to the chassis, so that the wheels 16 are dirigible. The frame 17 carries the bar 18 upon which is slidably mounted the draw bar yoke 19. The ends of the draw bar yoke surrounding the bar 18 are separated by a piece of tubing 20 provided with a slot 21 from which a series of aligned openings extend for the reception of a pin 22A fixed in the bar 18 so that when the draw bar yoke 19 is raised, it may be slid to one side or the other of the bar 18 so that the draw center is out of alignment with the center line of the vehicle and the pull on the draw bar yoke will of course have a tendency to make the truck travel to one side which will be the means of maintaining the cleaning truck a fixed distance from the wall being operated upon, inasmuch as guide wheels 23 are provided, one being disposed at each side of and carried by the fifth wheel or axle frame 17 in suitable brackets 24. These wheels are arranged to pivot about the pins 25 which maintain the wheel frames 26 in pivotal relation with the frames 24 and permit throw back of the wheels 23 as indicated in Figure 7 when they are not in use. Otherwise, as illustrated in Figure 6, one of the wheels 23 will ride along the curbing 27 and will, as before mentioned, maintain the truck at all times a satisfactory distance from the wall to be washed.

In order that the tubing 20 may be rocked and slid along the bar 18 to position the pin 22A in any desired slot 22B, we provide a handle 22 for this purpose.

The front end of the draw bar yoke 19 is connected through the medium of a suitable arrangement 28 with the rear end of a motor vehicle 29 which not only is employed for the purpose of moving the cleaning vehicle slowly along the wall but also carries the power plant 30 which operates an air compressor 31 to supply air under pressure to the liquid tank 10 of the cleaning vehicle. The compressed air supplied by the compressor 31 also is utilized for revolving and otherwise operating the cleaning brushes which are carried on suitable stanchions 32 mounted on the various portions 6, 7, 8 and 9 of the cleaning vehicle, it being noted that the stanchions are suitably spaced and arranged so that the brushes carried thereby when operated by the attendant may be effectively used to clean every portion of the wall from top to bottom.

Figure 9:
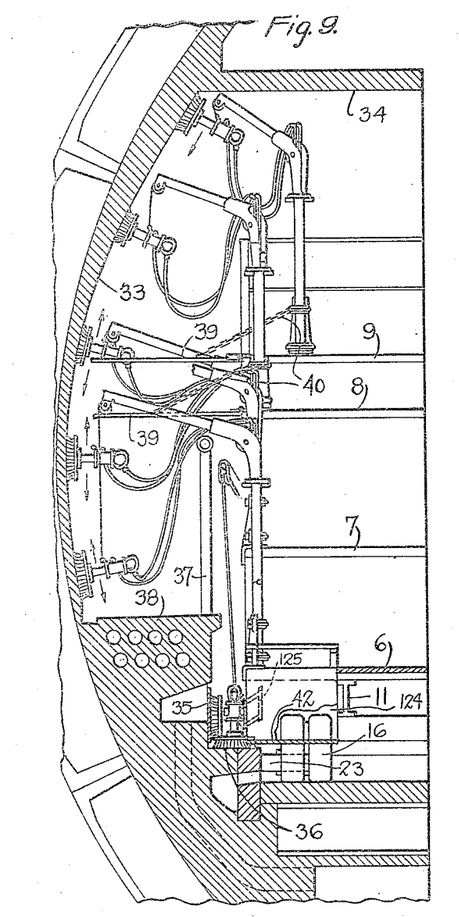
Figure 9 is a view of one-half of the machine taken in a fragmentary cross section of the tunnel, the view of the machine being in rear elevation and illustrating the relative position of the stanchion which supports the cleaning brushes, this view also illustrating the foot path or walk and railing along one side of the tunnel as well as the baffle plate and curbing.
Figure 10:
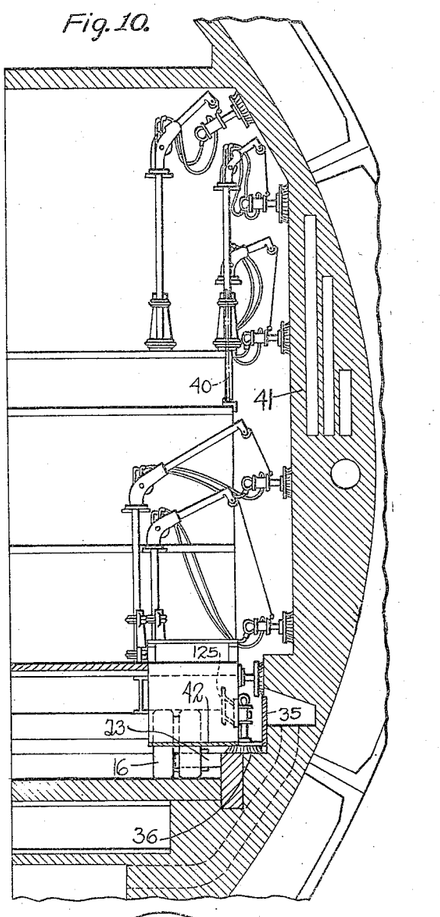
Figure 10 is a similar view but of the right hand side of the tunnel showing the different shape of the wall than that illustrated in Figure 9 and showing also how the machine is adapted to be rolled along the curbing on the opposite side of the tunnel, the view illustrating particularly the adaptability of the machine to tunnels or other walls of different contours.

While we realize that our machine may be employed to clean any wall and ceiling and while we do not wish to be limited to its use in any respect, it might be pointed out that the machine is particularly adapted for the cleaning of the interior walls and ceiling of a vehicular tunnel, its particular adaptation for this type of work being illustrated in Figures 9 and 10 in which the diametrically opposite walls of a tunnel are illustrated, the walls being of different shape, made necessary by the particular construction of the tunnel and presenting problems in cleaning which have heretofore never been encountered to our knowledge.

It will be noted in Figure 9 that the side wall of the tunnel or tube is curved as at 33 while the ceiling 34 is horizontal. The ceiling 34, the curved side walls 33 as well as the baffle plate 35, covering an air duct, and the top of the curb 36 has to be cleaned and in order that the side wall may be cleaned, the cleaning brushes must be extended out beyond the edge of the truck upon which they are mounted in order to clear the railing 37 which forms a guard for the foot walk 38. In order, therefore, that the upper brushes may be manipulated, we have provided the step portions 8 and 9 of the truck with foldable bridges 39, see Figure 9 which are suitably supported by the chains 40 and may be folded up out of the way when not in use, and which affords a support for the operator manipulating the brushes when the machine is used as illustrated in Figure 9 against a wall of irregular formation and where the space between the edge of the truck and the wall makes an extension of this type necessary.

In the cleaning of tunnels, for instance, the cleaning truck, of course, will be operated in the same direction to clean both side walls of the tunnel and in the event that the vertical wall of the type illustrated in Figure 10, by the numeral 41, is encountered, the bridges 40 need not be lowered because the brushes may be manipulated directly from the truck by the operator, it being of course understood that the opposite side of the tunnel also is equipped with a baffle plate and curbing 35 and 36, similar to the one mentioned heretofore. The cleaning truck is equipped at its opposite sides with the steps 42 which permit an attendant or operator to manipulate the lowermost brush where the character of the wall permits it, without leaving the truck.

Referring again to the ceiling cleaning mechanism, which has been indicated generally by the numeral 13, it will be noted that the front of the truck or vehicle 5 is provided with the brackets 44, (Figures 1, 3 and 4 and 12), the brackets at their outer ends being each provided with a dowel 45 which is arranged to receive thereover the lower end of a tubular supporting pipe 46, the lower end being secured to the dowel through the medium of the set screw 47. In view of the fact that the ceiling cleaning mechanism is substantially alike on both sides of the center of the truck, it is believed that a description of one-half will suffice.

Figures 4, 5, 28:
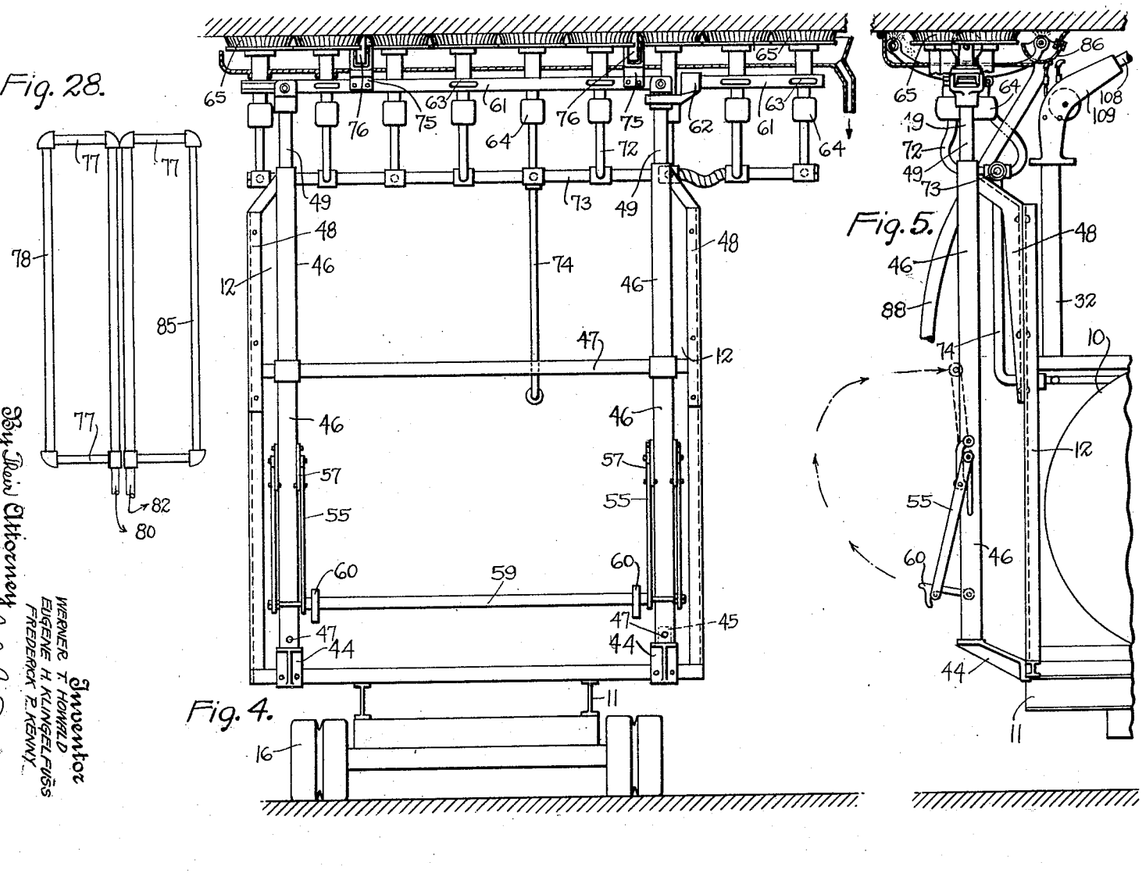
Figure 4 is a view in elevation of the front end of our machine showing the ceiling cleaning attachment carried thereby.
Figure 5 is a view in side elevation of the ceiling cleaning attachment as illustrated in Figure 4.
Figure 28 is a diagrammatic plan view of the piping used in connection with the ceiling apparatus, one section of the piping being used for the fog spray and the other section being used for the rinse.
Figures 11, 12, 13:
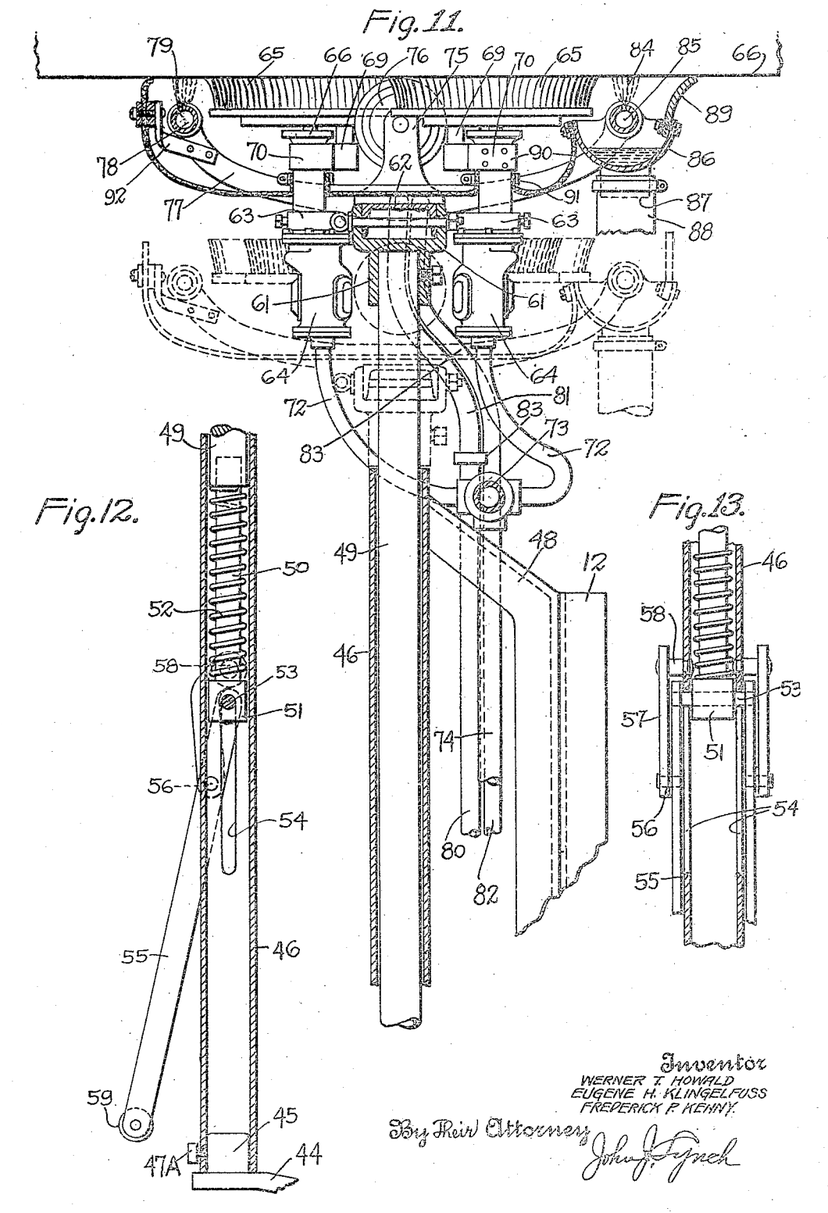
Figure 11 is an enlarged view in end elevation of the ceiling cleaning attachment which is supported at the forward end of the truck and which is arranged to be dropped down out of the way when not in use.
Figure 12 is a view in sectional elevation of the lower end of the ceiling cleaning supporting means and is a continuation of the lower part of the mechanism shown in Figure 11.
Figure 13 is a view in sectional elevation taken at right angles to the view shown in Figure 12 and illustrating the mounting of the throw lever through the medium of which the ceiling cleaning attachment is lowered when not in use.
Figures 14, 15:
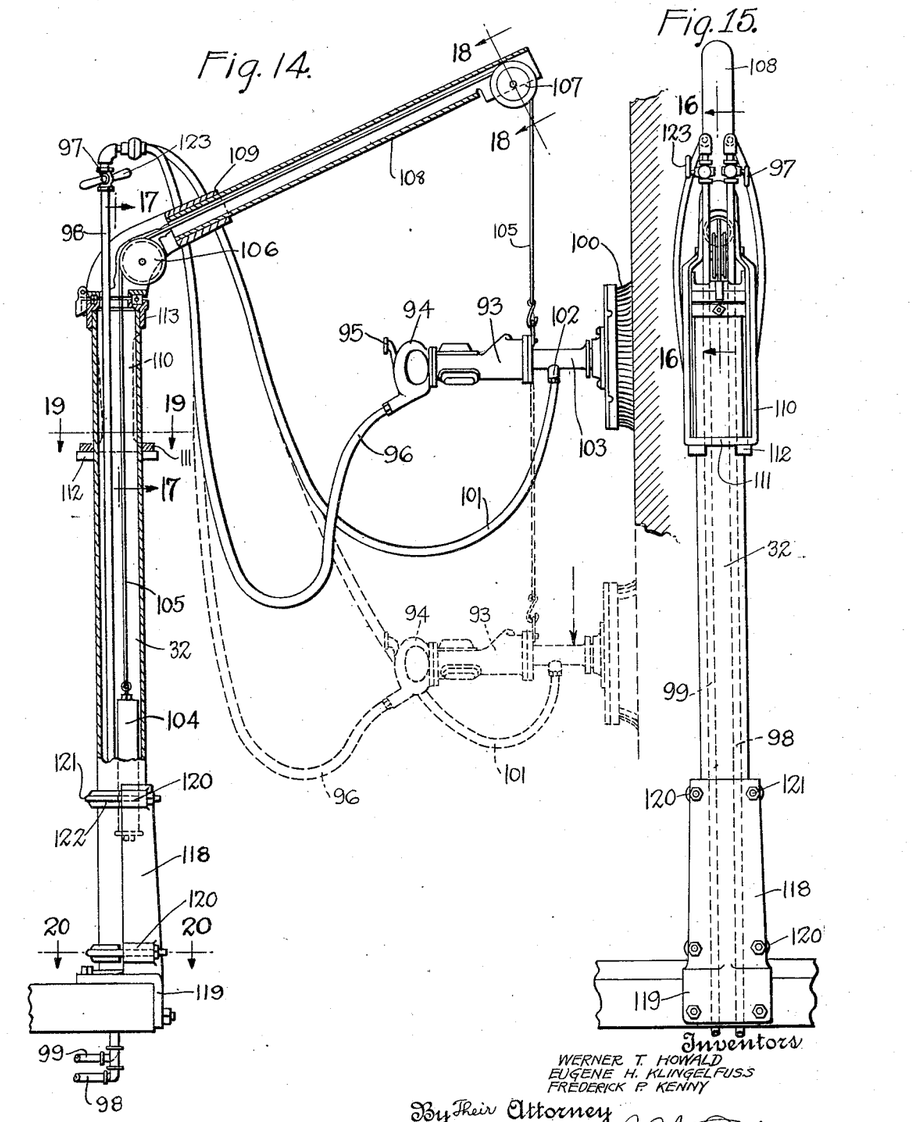
Figure 14 is a view in elevation of one of the stanchions or posts which is employed to support in movable relation one of the cleaning brushes, parts of the post being broken away to illustrate the interior construction.
Figure 15 is a view in rear elevation, that is, a view looking toward the right at Figure 14 of the cleaning brush supporting stanchion.
Figures 16, 18:
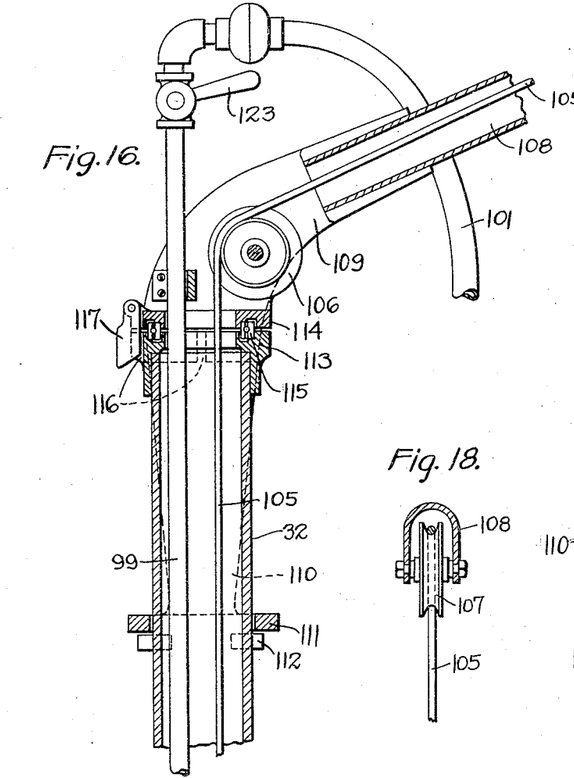
Figure 16 is an enlarged section taken on the line 16—16 of Figure 15 and illustrating the pivotal connection of the top of the post with the upright portion thereof so that the swinging of the cleaning brush may be accomplished.
Figure 18 is a section taken on the line 18—18 of Figure 14, the section being enlarged to show the mounting of the pulley in the end of the arm.
Figure 17:
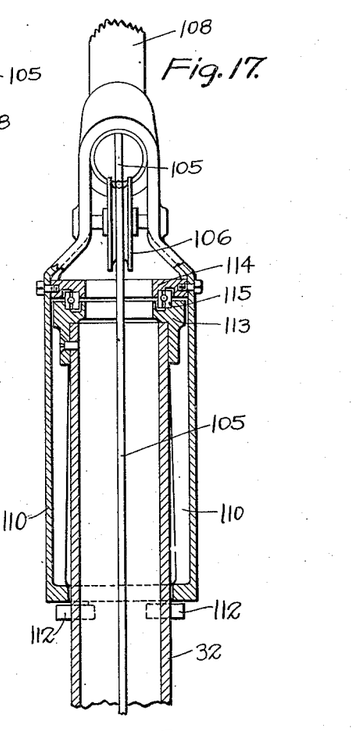
Figure 17 is a section taken on the line 17—17 of Figure 14, the section being enlarged to show the interior parts of the brush supporting arm.
Figure 19:
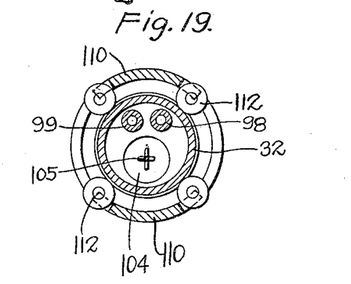
Figure 19 is an enlarged section taken on the line 19—19 in Figure 14 and shows the guide rollers carried on the apron arm that permit revolving movement thereof around the supporting post.
Figure 20:
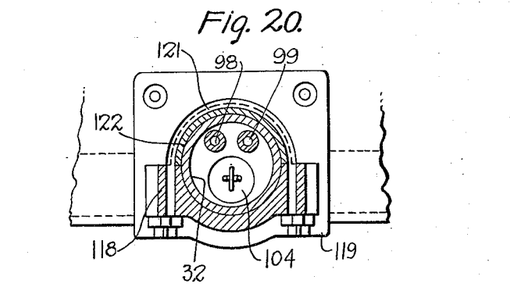
Figure 20 is a section taken on the line 20—20 of Figure 14 and enlarged to show the method of connecting the stanchion with a bracket which supports the same on the edge of the truck or machine.

The tubular supports 46 are braced by a suitable cross bar 47 and by reinforcing angle members 48 which are secured to the frame 12 of the truck. Each tubular support 46 is arranged to house the depending tubular portions 49 of the ceiling brush frame, the lower ends of which are arranged to receive for sliding movement therein, the rods 50, these rods being provided with an enlarged lower portion 51 and being arranged to receive the cushioning spring 52 which extends between the lower end of the depending portion 49 of the ceiling brush frame and the enlarged portions 51 of the rods 50. These enlarged portions 51 as noted in Figures 12 and 13 are each provided with a pin 53 which is arranged to slide in the diametrically opposite slot openings 54 provided at the supporting pipe 46, the pins being secured in the ends of twin levers 55 which are fulcrumed as at 56 in the support arms 57. These support arms are pivoted as at 58 at diametrically opposite sides of the tubular support 46. The lower ends of the twin levers 55 are connected through the medium of a cross bar or handle 59, see Figures 4 and 5, and it will be evident that through the medium of the springs 52, the ceiling brush frame is in substantially floating relation relatively to the tubular support 46 and a downward movement of the handle 59 will cause an upward movement of the block or enlarged portion of the rod 51 with the result that the spring will be slightly compressed due to the weight of the brush frame and the upward movement of the rod 50 and its enlarged portion 51 which projects the brushes against the ceiling and maintains them there. The springs 52 compensate for any unevenness in the road and maintain the brushes in contact with the ceiling. In order to keep the ceiling brush frame raised, suitable hooks 60 pivoted to the support tubes 46 or other convenient part of the vehicle, may be employed, these hooks engaging the bar 59 when the same has been drawn to its lowered position, as illustrated in Figure 5.

The upper ends of the members 49 carry the saddle 61 in which is supported the transversely extending inverted channel member 62 to the opposite sides of which are secured and in relatively staggered relation, the clamps 63 which hold the air motors 64 in place.

Figure 21:
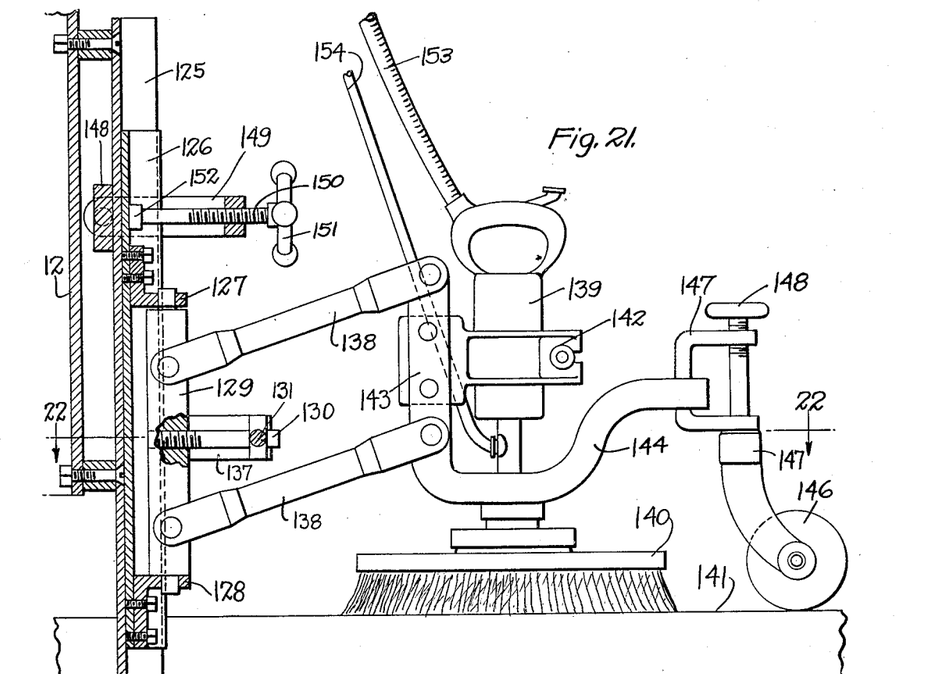
Figure 21 is a view in side elevation greatly enlarged of the curved cleaning brush and its supporting bracket.
Figures 24, 25:
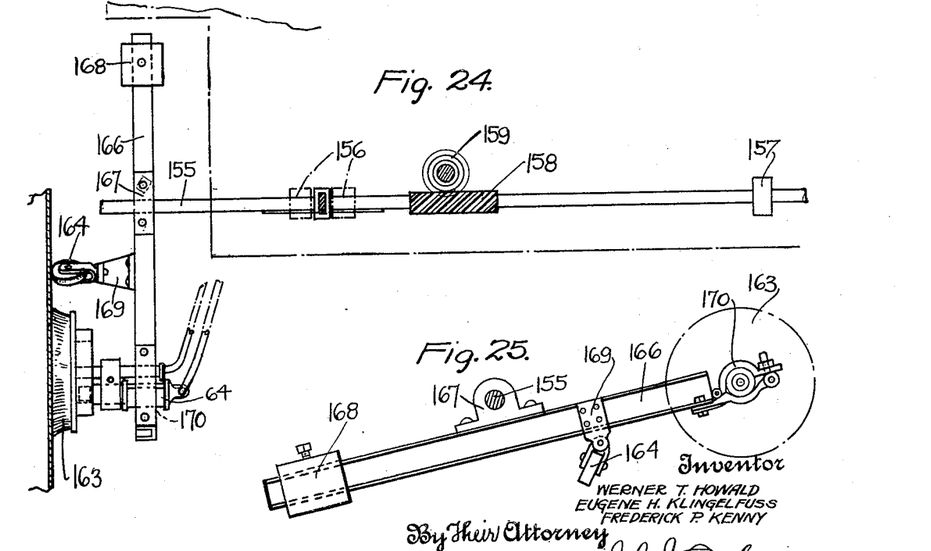
Figure 24 is a section taken beneath the flooring of the machine as illustrated in Figure 23 to show how the baffle cleaning brush and its guide rollers and counter weights are mounted.
Figure 25 is a view in side elevation showing how the brush is mounted in the counter weighted sweep arm.
Figure 26:
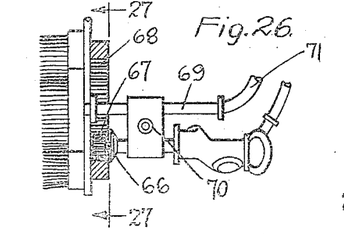
Figure 26 is a view partly in section of the baffle plate cleaning brush illustrated in connection with Figure 24.
Figure 27:
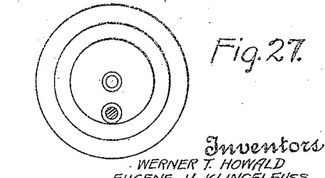
Figure 27 is a section taken on the line 27—27 of Figure 26.

These air motors 64 are a standard product in the trade and hence, their interior mechanism has not been illustrated, it being understood that these air motors make use of compressed air to obtain rotary movement of their shaft which projects beyond their housing and which may be used to obtain rotary movement of a tool, in this instance, the brushes 65 which revolve in contact with the ceiling 66 to perform a cleaning operation. At this time, it might be noted that in this cleaning machine only two types of brushes are employed, both of which are operated by the air motors 64. Some of the brushes have a slower rotary movement than others, for instance, as illustrated in Figure 21, the brush which is used to clean the curb, is secured directly to the air motor shaft and revolves the same number of revolutions as said shaft, while the brush construction illustrated in Figures 24, 26 and 27 is identical to the brush construction used in the ceiling cleaning attachment, being only different from the brush construction illustrated in Figures 21 and 22 in that the drive shaft 66 carries a pinion 67 which operates on the inner periphery of a ring gear 68 to more slowly revolve the brush than is the case in the construction illustrated in connection with Figures 21 and 22, the brush of the slow revolving type being mounted upon the hollow auxiliary shaft 69 which is suitably secured to the air gun through the medium of a clamp 70. In the ceiling cleaning brush, this auxiliary shaft 69 is not used as a conduit to supply the brush with water and soap mixture, although it may be used for this purpose as illustrated in Figure 26 by connecting thereto the end of a fluid conducting hose 71. The air motors 64 are connected through the medium of the flexible tubes 72 to the laterally extending air supply tube or pipe 73 which in turn receives its air from the vertical air pipe 74 which is connected to the air compressor in any suitable manner.

The channel cross bar 62 is arranged to support the wheel bracket 75 in which are journalled the wheels or rollers 76 which bear against the ceiling to permit easy and proper travel along the ceiling of the cleaning frame and brushes. The channel frame 62 also carries a rectangular piping arrangement 77, one of whose transverse sections 78 disposed forwardly of the brushes 65 is provided with fine perforations 79 in order that a fog spray may be produced with the use of the cleaning fluid that is ejected through the pipe 78 and spread over the surface of the ceiling. The pipes 78 and 77, the latter of which is the end branch of the transversely extending pipe 78 is connected to the cleaning fluid supply pipe 80 through the medium of a flexible hose 81, while the clear water pipe 82 supplies fresh or clean water through the medium of a flexible hose 83 to the cleansing spray indicated by the numeral 84 which is projected from the pipe 85, this pipe construction being similar to the one arranged to supply the fog spray and being also carried by the channel member 62.

The pipe 85 has secured thereto a suitable trough 86 provided with an outlet 87 and drain 88 which permits discharge of the rinse water after it has impinged upon the ceiling, the excess moisture being wiped from the ceiling through the medium of a suitable squeegee 89 which is secured to and extends along the rear edge of the trough 86, the opposite side of the trough 86 has secured thereto one edge of a suitable drip trough 90 which is made of suitable waterproof material and through the medium of the clamps 91, is secured about the shaft housings of the air motors 64, the forward end of the drip trough 90 being supported from the extended portions 77 of the pipe 78 through the medium of the brackets 92, the upper, forward ends of the trough 90 being arranged to slide along the ceiling to remove therefrom the excess dirt and dust before the fog spray is applied.

The side walls are cleaned by an attendant or operator who stands on the platforms 6, 7, 8 or 9 of the cleaning vehicle and manipulate brushes, which, as illustrated in Figure 14 to Figure 20 inclusive, consists of air motors 93 which are provided with the handles 94 and control buttons 95, the latter of which are used to cut off the air supply coming through the hose 96 which is secured at its intake end through the medium of a suitable connection to the valve 97 carried on the upper end of the air pipes 98, it being understood that there is an air piping system carried on the cleaning vehicle which is supplied from the compressor, hereinbefore referred to, and there is also a piping system coming from the soap and water mixture which is held in one portion of the supply tank 10, a part of the tank being used also for fresh water which is used to supply the rinse pipe that forms a part of the ceiling cleaning device. The water pipe passing up through the stanchion 32 along with the air pipe 98 is indicated by the numeral 99 and this pipe 99 carries the soap and water mixture for cleaning the walls, the same being led from the pipe 99 into the center of the brush 100 through the medium of the flexible hose 101, whose inlet point 102 is in the brush operating shaft housing 103. These brushes as before mentioned are manipulated by an attendant and are moved up and down and sidewise on the wall in order to perfectly clean the same, the weight of the brushes being counter-balanced by a suitable counter weight 104 which has vertical movement within the stanchion 32, the same being supported upon a cable or chain 105 which passes over the guide pulleys 106 and 107, the latter being journalled in the extreme outer end of the arm 108 which is secured in any manner to the elbow 109, the opposite side walls of this elbow provide a bearing for the pulley 106 hereinbefore referred to and the vertical portion of the elbow 109 is shaped to provide apron-like depending extensions 110 which are flanged in their lower portion as at 111 to support the rollers 112 which bear against the outer surface of the stanchion 32 and provide for the free rotative movement of the elbow 109 and its extension 110. In order to provide for the further free operation of the elbow 109 so that the arm may be swung about the stanchion as a center, an end ring 113 is mounted on the upper end of the stanchion and between the ring and a suitable flange ring 114, there is provided an anti-friction bearing 115. The flange ring 113 is provided with notches 116 in which a latch 117 may be seated. When the arm 108 is swung to various positions, that is, to either an operative or an inoperative position, the latch 117 being suitably pivoted in the elbow ring 114 and being gravity operated so that it will drop into any of the latch seats or notches 116 of the stanchion ring. The lower end of the stanchion 32 is fixedly secured in a bracket 118 of semi-circular shape in its upstanding portion, the lower part thereof being flanged as at 119 to fit over the edge of the vehicle flooring. The upright portion of the bracket 118 is provided with the bosses 120 in which the shackle bolts 121 are held, there being interposed between the bolts and the stanchion, suitable saddles 122 so that the stanchions 32 are solidly secured in place and do not move.

The arms 108, it will be noted, may swing transversely of the vehicle or longitudinally thereof, depending upon how far away the wall is that is being operated upon. A suitable valve 123 is employed in the cleaning liquid pipe 99 for shutting off the supply when the machine is not in use.

Any number of these stanchions may be employed along the sides of the cleaning vehicle and it will be understood that in connection with the step formation of the vehicle, a slight operation of the brushes vertically will afford a sweep of the entire height of the wall by the truck or vehicle, as it passes and consequently, it can be moved continuously and the operation of the brushes vertically by each of the attendants will thoroughly clean a wall with a minimum of labor and time.

Figure 1:
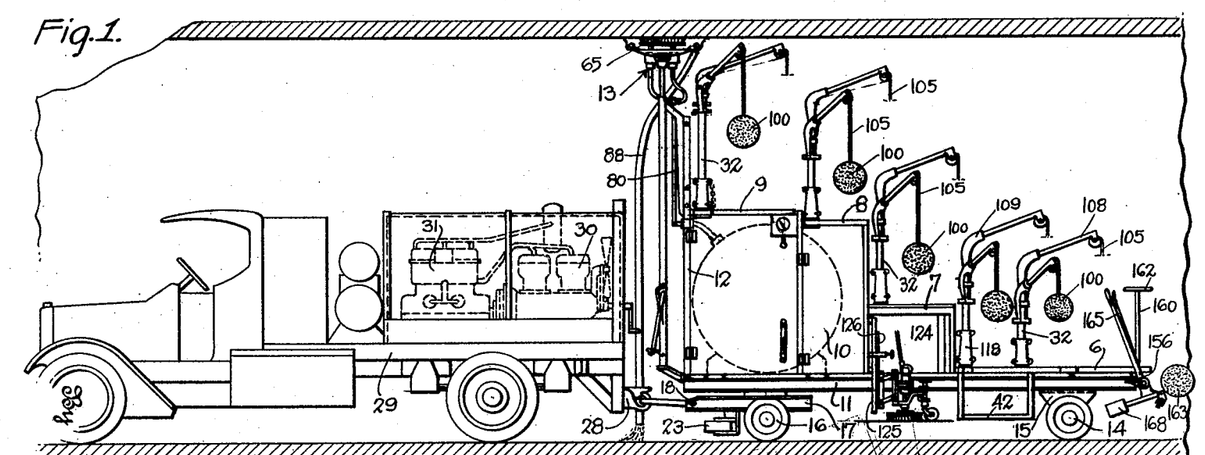
Figure 1 is a view in side elevation of a cleaning machine constructed in accordance with our invention, the same being illustrated as drawn by a motor vehicle upon which is mounted a power plant and air compressor.
Figure 2:
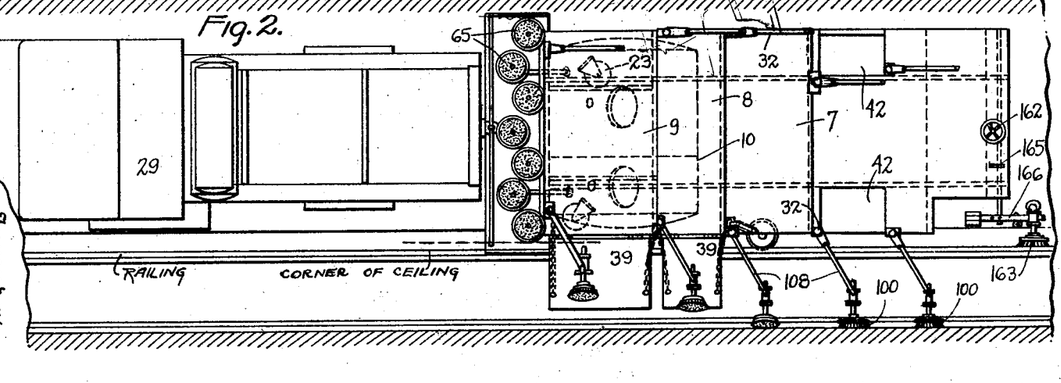
Figure 2 is a top plan view of the machine illustrated in Figure 1, the platform extensions being shown whereby the operators may reach a wall over a walk and railing disposed at one side of the wall.
Figure 3:
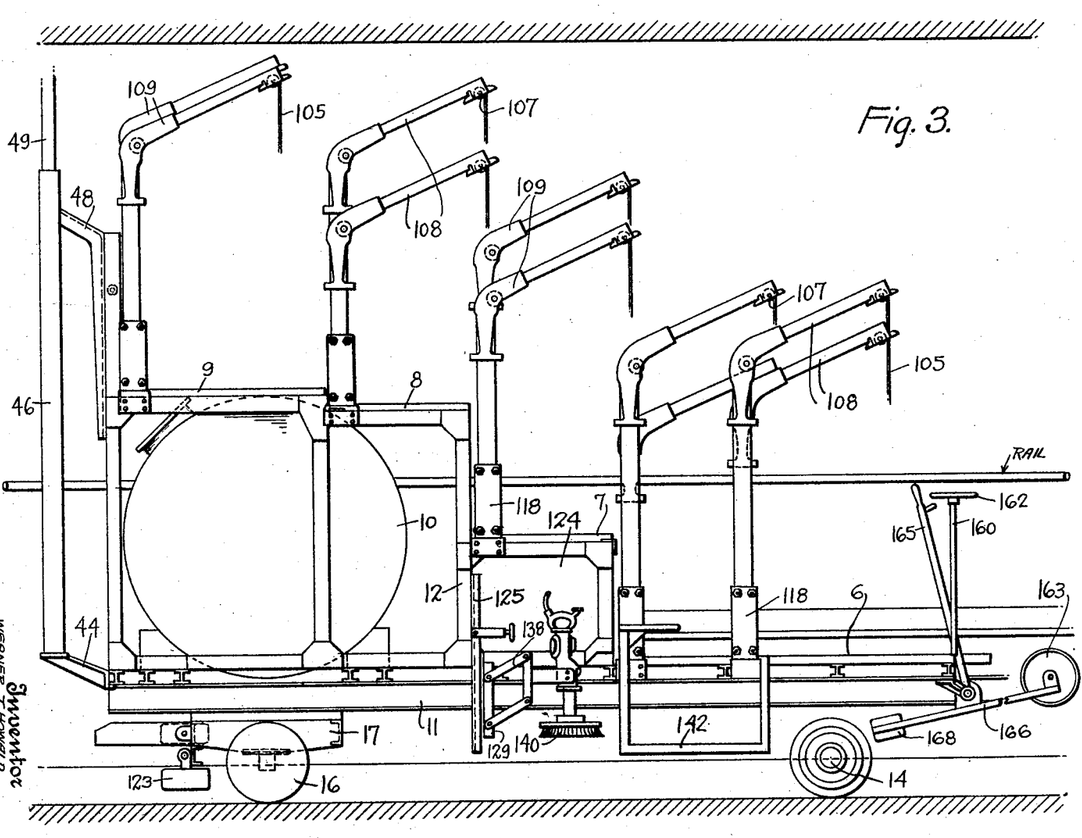
Figure 3 is an enlarged view in side elevation of our improved machine, the cleaning brush supporting stanchion being illustrated.

In connection with the cleaning of a curbing, as indicated in Figures 1, 3, 9, 10, 21 and 22, adjacent the steps 42 provided at the opposite sides of the cleaning vehicle, there is provided an opening 124 to the forward side of which is secured, for instance, to the framework 12 of the vehicle, the vertical channel member 125 into which may be slid the curb brush carrier 126 which as illustrated in Figure 2, is channel-shaped in cross section and provided with the upper and lower extensions 127 and 128 respectively, between which is pivoted for swinging movement, the lever block 129. This lever block carries in its mid section, an extending pin 130 which passes through an eye 131 formed on the end of the yieldable holder 132. This holder consists of a shank 133, the upper end of which carries a hand wheel 134 threaded to the shank 133 in order to compress the spring 135 surrounding the shank and extending between the hand wheel 134 and a washer 136 which is interposed between the end of the spring and a bracket 137, the end of which is slotted to permit passage of the shank 133 of the holding device. It is quite evident that with the tension on the spring 135 there will be a resistance against swinging movement or turning movement of the lever carrying block or member 129. This block has pivoted thereto the double levers 138 which permit vertical movement of the air motor 139 which drives the brush 140 that cleans the curbing 141. This air motor is held in a suitable clamp 142 which, in turn, is secured between the vertical portions 143 of roller carrying arms 144, one of the arms 144 being arranged to have pivoted in the end thereof a wall engaging wheel 145 which maintains the peripheral edge of the brush 140 in proper relation with the wall, while the other arm 144 carries a curb roller 146 which maintains the brush 140 in proper relation to the top surface of the curbing 141.

This wheel 146 is journalled in a pivoted wheel carrying frame 147, a suitable adjusting screw 148 being employed whereby the vertical movement of the roller 146 may be adjusted.

It is to be understood that with the particular use to which our machine is put, that is, of cleaning a tunnel, the machine will travel in the same direction in cleaning both sides of a tube and in order to eliminate the necessity of making up duplicate parts, we have designed the curb cleaning brush so that it can be quickly removed from the channel 125 in which it is supported at one side of the machine and can be placed in the channel member 125 at the opposite side of the machine. For this purpose there is employed, a block 148 which is suitably secured to the back of the channel 125 and to which is pivoted the vise frame 149. This vise frame has adjustably secured therein, a vise screw 150 which may be manipulated through the medium of the hand wheel 151 and which, when operated will jam the enlarged holding end 152 thereof against the wheel carrying frame or member 126 in order to hold it securely in place within the channel 125. Thus, in changing the brush from one side of the machine to the other, it is simply necessary to operate the hand wheel 151 until the vise screw releases the carrier 126, the brush frame will then, of course, be released by proper manipulation of the tension member 132 and it will be swung clear of the curb and the carrier 126 will be slid down until its upper end comes from beneath the vise screw after which the air and water connection 153 and 154 respectively, may be disconnected and the brush taken to the opposite side of the machine.

In cleaning the lower part of a wall or the side of a curbing or the side of a baffle plate, it is necessary that another arrangement of brush be used as illustrated in Figures 3, 1, 23 and 27 inclusive, which consists of a shaft 155 mounted preferably adjacent the rear end of the cleaning truck and extending transversely thereof, the same being mounted in suitable bearings 156 and 157. The shaft 155 carries intermediate its ends, a worm 158 which is engaged by a worm wheel 159, the worm wheel being carried on the lower end of an operating spindle 160 which is suitably supported in a standard 161 secured to the the flooring of the vehicle, the upper end of the spindle carries a suitable hand wheel 162 through the medium of which the shaft may be moved laterally to bring the cleaning brush 163 and its companion roller 164 up against the surface to be cleaned. The shaft 155 has splined thereto, a rock lever 165 which, together with the hand wheel 162 is operated by the attendant. The rocking of the lever 165 causing oscillation of the shaft 155 which, in turn, imparts an oscillatory movement to the brush carrying frame 166. This frame 166 may be of channel iron or of any other suitable cross section and through the medium of an ear 167 or bearing, is carried on the shaft 155 at one side of the truck, this frame 166 being duplicated on the other side of the truck for cleaning a section of wall or curbing.

The end of the frame 166 carries an adjustable counter weight 168 so that the brush 163 is properly counter-balanced and manipulation of the lever 165 is facilitated. The frame 166 also carries through the medium of a suitable bracket 169, a guide roller 164 which maintains the brush 163 in its proper relation with the surface to be cleaned. The cleaning brush 163 is of the construction illustrated and described in connection with the ceiling attachment, see particularly Figures 26 and 27, the brush being secured at the end of the frame 166 in a clamp 170 carried by said frame, the brushes connected by suitable conduits with the compressed air which operates the brush motor and to the tank of cleaning liquid.

The truck will, of course, be equipped with suitable side, tail and forward lights which have not been illustrated and other necessary accessories, so that the unit is complete in itself and equipped to thoroughly clean the side walls and ceilings of a structure, particularly a tunnel, in which curbings, baffle plates, side walls of an irregular shape and a ceiling, must be thoroughly cleaned in order to keep the tunnel in a sanitary condition.

It will be understood that our invention is equally applicable to the cleaning of any particular wall or ceiling and it is to be understood that in certain of its ramifications, it may be mounted upon a railway carriage for the cleaning of subway walls, station walls and the like as we do not wish to be limited to its use in connection with a drawn vehicle.

It is quite evident that we have provided a machine which will, by its continuous movement and by operation, manually or otherwise, of the cleaning brushes along a wall or ceiling, will thoroughly clean surfaces with a minimum of labor and time.

It is also evident that the device is applicable in tunnels or the like where a side walk is used, it being necessary to extend a part of the truck over the walk in order that the attendant may manipulate the brushes for a thorough cleaning of the surface.

It will be understood that all of the guide wheels and wheels upon which the trucks are mounted may be rubber tired in order that they will not mar the walls or curbings against which they roll and also the brushes employed may be of different character, for instance, soft hair brush will be used on glazed or smooth surfaces and stiff bristles or metal brushes may be employed on rough surfaces where thorough cleansing is necessary. Also, slow speed brushes are used on the ceiling and baffle plates in order that thorough cleansing may be accomplished by these brushes in view of the fact that no attendant is necessary in their manipulation with the exception of the lower side wall or baffle plate brush 163 which is simply oscillated by the attendant and is not held against the wall or operated manually by them.

Figure 29:
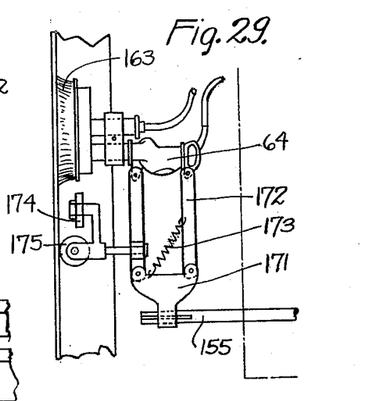
Figure 29 is a top plan view of a modified form of baffle plate brush which may be substituted for the brushes shown in Figures 23 and 24.

In Figure 29, we have illustrated a modified form of baffle plate cleaning brush 163, the supporting means for which completely eliminates the necessity of having a counterweighted arm, the construction comprising the usual shaft 155 which has bound thereto a bracket 171 to which the parallel arms 172 are pivoted. Each of these arms at their outer ends are suitably connected to the air motor of the brush 163 which, in the usual manner is connected to water and air inlets or conduits. One of the arms 172 is connected through the medium of a coil spring 173 to the bracket 171 so that the brush 163 is normally urged toward the baffle plate or wall in connection with which it is used. The opposite arm 172 is arranged to support the vertical and horizontal rollers 174 and 175 respectively which maintain the brush edge the proper distance from the curbing and maintain the brush itself the proper distance from the wall.

Figure 22:
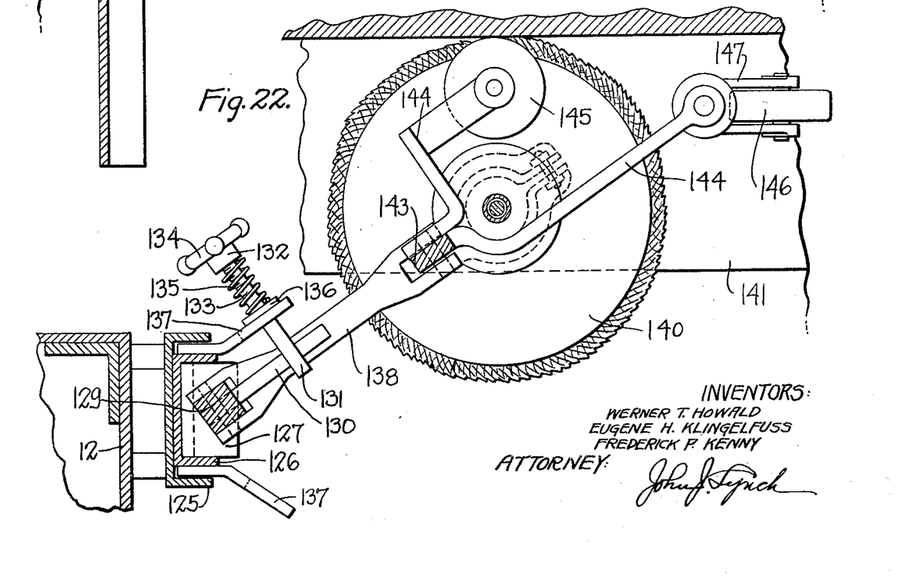
Figure 22 is a section taken on the line 22—22 of Figure 21, further showing the construction of the curb cleaning brush and its guide rollers.
Figure 23:
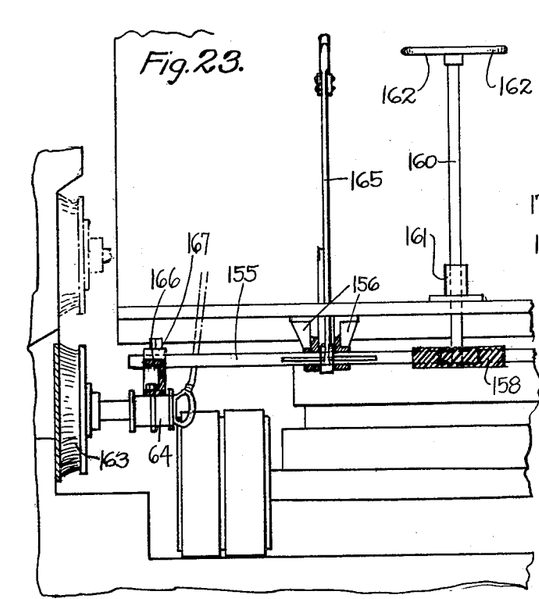
Figure 23 is a view in end elevation of the lower part of the rear end of the vehicle showing the mounting thereon of the baffle plate cleaning brush which is arranged to be oscillated and also adjusted relatively to the baffle plate.

If desired, the shaft 155 will be manipulated in the same manner although, it will be quite evident that no manipulating connection need be made to the shaft 155 as the brush will maintain its proper distance from the curb and through the medium of the spring 173 will be normally urged against the surface to be cleaned at all times and thus it will operate without attention and if desired, may be transferred to the opposite side of the machine in the same manner as the curb cleaning brush illustrated in Figures 21 and 22.

While we have illustrated and described our invention with some degree of particularity, we realize that in practice various alterations therein may be made without departing from the spirit of the invention or the scope of the appended claims.

What we claim is:—

1. In a machine of the character described, a body, platforms in stepped formation on the body, surface engaging members supported on said stepped platforms and movable relatively thereto, and means for supplying a liquid to said members.

2. In a machine of the character described, a body consisting of platforms of heights to provide a stepped formation, movable implements arranged along the edge of said platforms, and swingable stanchions on the platforms for supporting said implements in movable position to sweep a wall.

3. In a machine of the character described, a truck, air and liquid supply tanks on the truck, a plurality of brushes for engaging a surface to be operated upon, conduits for connecting said supply tank with said brushes, stanchions on the truck at the sides thereof, swingable arms on the stanchions, means for suspending said brushes from the stanchion arms and a counterweight for each of said brushes.

4. A machine for operating upon a ceiling surface comprising a wheeled body, a frame on the body, a frame support, means for raising and lowering the frame in the support, a plurality of ceiling engaging brushes carried by the frame, and yieldable members interposed between said frame and support.

5. In a machine of the character described, a shaft, a hand lever for rocking the shaft, brackets for supporting the shaft transversely of the machine, a wall engaging brush at one side of the machine, means for securing the brush to the shaft including parallel arms, and a clamp on the shaft to which said arms are pivoted, means for normally urging the brush against the wall, and a wall engaging guide roller on one of said arms, adjacent the brush.

6. In a machine of the character described, a shaft, means for supporting the shaft on the machine, a brush at the side of the machine, means for rocking the shaft, means for reciprocating the shaft including a spindle and gear connection with the shaft, means for securing the brush to the shaft including parallel arms and a bracket to which said arms are pivoted, a guide roller carried by one of said arms for permitting proper pressure of the brush in contact with a wall, and means for urging the brush toward the wall.

7. A cleaning machine comprising a truck, vertical channels on the opposite sides of the truck, a frame removably secured in one of the channels at one side of the truck, and a horizontal surface engaging brush carried in said frame.

8. A cleaning machine comprising a truck, channels on the opposite sides of the truck, a frame removably secured in one of the channels, a horizontal surface engaging brush carried in said frame, a guide wheel in the frame, and means for adjusting said guide wheel whereby the brush is adjusted toward and away from the surface to be engaged.

9. In a machine of the character described, a body consisting of platforms of heights to provide a stepped formation, movable implements arranged along the edge of said platforms, and stanchions on the platforms for supporting said implements in movable position to sweep a wall.

10. In a machine of the character described, a body consisting of platforms of heights to provide a stepped formation, hollow stanchions mounted on said platforms, a pivoted portion on each of said stanchions, a spraying member suspended from said pivoted portion and a counterweight for the spray in said stanchions.

11. In a machine of the character described, a body consisting of platforms of heights to provide a stepped formation, an undercarriage for said body, a cross bar mounted on said undercarriage, a drawbar having a sleeve arranged about and slidable along said cross bar, said sleeve having a slot and notches opening off said slot, a pin on the cross bar selectively engaging said notches to provide for an unequal pull on said cross bar, a handle on the sleeve and laterally extending guide wheels on the vehicle.

Signed at Brooklyn, in the county of Kings and State of New York this 19th day of April, 1929.

WERNER T. HOWALD. [L. S.]
EUGENE H. KLINGELFUSS. [L. S.]
FREDERICK P. KENNY. [L. S.]